United States Patent
Hayama

(10) Patent No.: US 11,082,121 B2
(45) Date of Patent: Aug. 3, 2021

(54) "APPARATUS AND METHOD FOR TRANFERING A COMMUNICATION SIGNAL WHILE STORING A DETECTED PREAMBLE PATTERN"

(71) Applicant: Mitsubishi Electric Corporation, Tokyo (JP)

(72) Inventor: Michiya Hayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/755,740

(22) PCT Filed: Oct. 19, 2017

(86) PCT No.: PCT/JP2017/037838
§ 371 (c)(1),
(2) Date: Apr. 13, 2020

(87) PCT Pub. No.: WO2019/077717
PCT Pub. Date: Apr. 25, 2019

(65) Prior Publication Data
US 2020/0328799 A1 Oct. 15, 2020

(51) Int. Cl.
*H04B 7/15* (2006.01)
*H04B 7/26* (2006.01)
(Continued)

(52) U.S. Cl.
CPC ............. *H04B 7/15* (2013.01); *H04B 7/2606* (2013.01); *H04W 16/26* (2013.01); *H04W 84/047* (2013.01); *H04W 88/04* (2013.01)

(58) Field of Classification Search
CPC ...... H04B 7/15; H04B 7/2606; H04B 7/1851; H04W 16/26; H04W 84/047; H04W 88/04
See application file for complete search history.

(56) References Cited

U.S. PATENT DOCUMENTS

| | | | |
|---|---|---|---|
| 2003/0137966 A1* | 7/2003 | Odman | H04L 1/20 370/347 |
| 2005/0281316 A1* | 12/2005 | Jang | H04L 5/023 375/130 |

(Continued)

FOREIGN PATENT DOCUMENTS

| | | |
|---|---|---|
| JP | 2006-505148 A | 2/2006 |
| JP | 2010-93576 A | 4/2010 |

(Continued)

OTHER PUBLICATIONS

Nabar et al., "Fading Relay Channels: Performance Limits and Space-Time Signal Design", IEEE Journal on Selected Areas in Communications, vol. 22, No. 6, Aug. 2004, p. 1099-1109.

*Primary Examiner* — Afshawn M Towfighi
(74) *Attorney, Agent, or Firm* — Birch, Stewart, Kolasch & Birch, LLP.

(57) ABSTRACT

A communication apparatus includes: a reception unit that receives a communication signal; a preamble detection unit that detects a preamble pattern from the communication signal; and a transfer processing unit that, when the preamble pattern detected by the preamble detection unit is a predetermined preamble pattern, changes the preamble pattern included in the communication signal in accordance with a predetermined rule, and transfers the changed preamble pattern.

13 Claims, 13 Drawing Sheets

(51) Int. Cl.
*H04W 16/26* (2009.01)
*H04W 84/04* (2009.01)
*H04W 88/04* (2009.01)

(56) References Cited

U.S. PATENT DOCUMENTS

| | | |
|---|---|---|
| 2010/0088426 A1 | 4/2010 | Takemura et al. |
| 2010/0183094 A1* | 7/2010 | Shimezawa ......... H04L 27/2647 375/316 |
| 2011/0292816 A1* | 12/2011 | Lee ................... H04W 74/0866 370/252 |
| 2012/0046043 A1 | 2/2012 | Jitsukawa |
| 2014/0169303 A1 | 6/2014 | Jami et al. |

FOREIGN PATENT DOCUMENTS

| | | |
|---|---|---|
| JP | 2012-44482 A | 3/2012 |
| JP | 2012-147182 A | 8/2012 |
| JP | 2015-97300 A | 5/2015 |
| JP | 2015-109701 A | 6/2015 |
| WO | WO 2009/001853 A1 | 12/2008 |

* cited by examiner

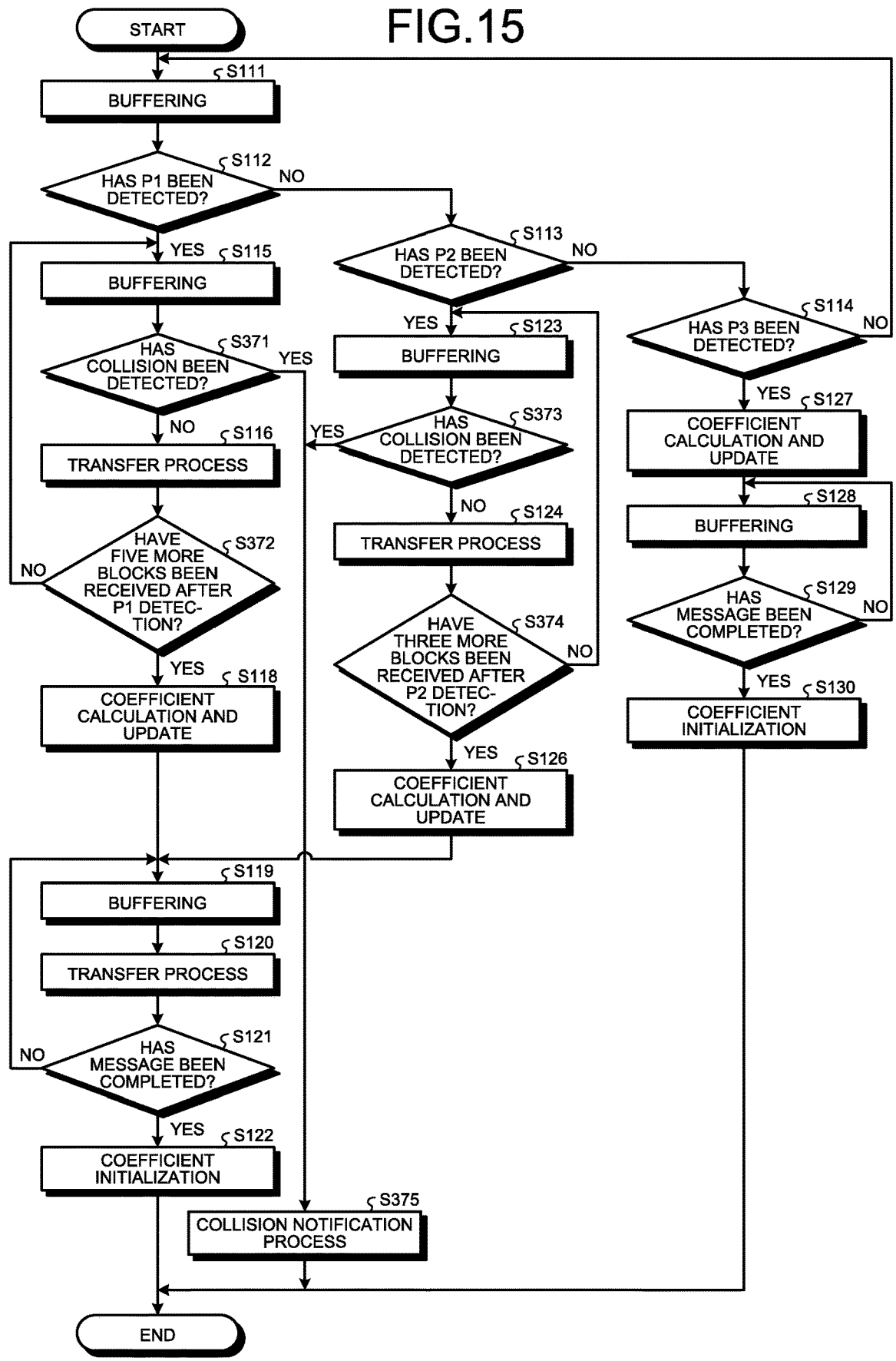

"APPARATUS AND METHOD FOR TRANFERING A COMMUNICATION SIGNAL WHILE STORING A DETECTED PREAMBLE PATTERN"

FIELD

The present invention relates to a communication apparatus and a communication method for transferring a message within a limited number of transfers.

BACKGROUND

Use of wireless communication for data transmission inside an artificial satellite has advantages in that the weight of wirings can be reduced, wiring design is easy, and high degree of freedom of arrangement is achieved, as compared with a case of use of wire communication. However, in an artificial satellite, severe demands are placed on radiation noise, so that transmission power is limited. For this reason, use of low power wireless communication, optical space communication, or the like may be considered. Various devices are disposed inside an artificial satellite, and a direct wave may not reach a target in communication between the devices due to obstruction by some other devices in some cases. For this reason, a technique for relaying and transmitting signals is used. When the technique for relaying and transmitting signals is used, it is necessary to prevent a signal from being transferred without limit.

Patent Literature 1 discloses a method in which an allowable number of transfers is described in a message and a value of the allowable number of transfers is reduced each time transfer is performed so as to limit the number of transfers. The allowable number of transfers is described in a field following a preamble, a data length, a destination, and the like among multiple fields in a header of a communication signal.

CITATION LIST

Patent Literature

Patent Literature 1: Japanese Patent Application Laid-open No. 2015-97300

SUMMARY

Technical Problem

However, in the technique described in Patent Literature 1, a communication apparatus cannot start transferring a frame until the communication apparatus receives a field in which the allowable number of transfers has been described, so that transmission delay accompanied with signal relaying increases, thereby resulting in a problem.

The present invention has been made in view of the above circumstances, and an object thereof is to provide a communication apparatus and a communication method capable of minimizing a transmission delay.

Solution to Problem

In order to solve the above-mentioned problems and achieve the object, the present invention provides a communication apparatus comprising: a reception unit to receive a communication signal; a preamble detection unit to detect a preamble pattern from the communication signal; and a transfer processing unit to, when the preamble pattern detected by the preamble detection unit is a predetermined preamble pattern, change the preamble pattern included in the communication signal in accordance with a predetermined rule and transfer the changed preamble pattern.

Advantageous Effects of Invention

The communication apparatus according to the present invention achieves an advantageous effect of minimizing a transmission delay.

BRIEF DESCRIPTION OF DRAWINGS

FIG. 15 is a flowchart illustrating an operation when the communication apparatus illustrated in FIG. 12 receives the communication signal illustrated in FIG. 11.

DESCRIPTION OF EMBODIMENTS

Hereinafter, a communication apparatus and a communication method according to embodiments of the present invention will be described in detail with reference to the drawings. The present invention is not necessarily limited by these embodiments.

First Embodiment

Figure 1:
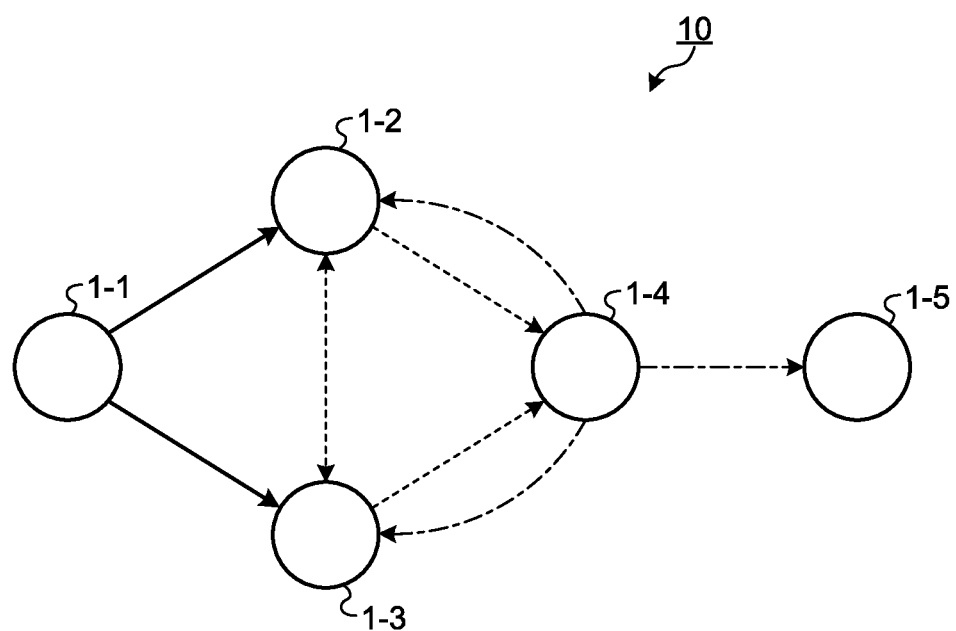
FIG. 1 is a diagram illustrating a configuration of a communication system according to a first embodiment of the present invention.

FIG. 1 is a diagram illustrating a configuration of a communication system 10 according to a first embodiment of the present invention. The communication system 10 includes communication apparatuses 1-1, 1-2, 1-3, 1-4, and 1-5. Hereinafter, when the communication apparatuses 1-1, 1-2, 1-3, 1-4, and 1-5 are not distinguished from each other, they are referred to as a communication apparatus 1 or communication apparatuses 1.

Each of the communication apparatuses 1 is a relay device configured to relay a communication signal received from a different communication apparatus 1. The communication apparatus 1-1 can directly communicate with the communication apparatuses 1-2 and 1-3, but cannot directly communicate with the communication apparatuses 1-4 and 1-5. The communication apparatus 1-2 can directly communicate with the communication apparatuses 1-1, 1-3, and 1-4, but cannot directly communicate with the communication apparatus 1-5. The communication apparatus 1-3 can directly communicate with the communication apparatuses 1-1, 1-2, and 1-4, but cannot directly communicate with the communication apparatus 1-5. The communication apparatus 1-4 can directly communicate with the communication apparatuses 1-2, 1-3, and 1-5, but cannot directly communicate with the communication apparatus 1-1. The communication apparatus 1-5 can directly communicate with the communication apparatus 1-4, but cannot directly communicate with the communication apparatuses 1-1, 1-2, and 1-3.

For example, when a message is transmitted from the communication apparatus 1-1 to the communication apparatus 1-5, the communication apparatus 1-1 converts the message into a communication signal and transmits the communication signal. The communication signal transmitted by the communication apparatus 1-1 is received by the communication apparatuses 1-2 and 1-3. The communication apparatuses 1-2 and 1-3 each transfer the received communication signal to the communication apparatus 1-4. The communication apparatus 1-4 transfers the received communication signal to the communication apparatus 1-5. By the multiple communication apparatuses 1 sequentially relay the communication signal as described above, bucket-brigade system transmission is realized, and the message is transmitted from the communication apparatus 1-1 to the communication apparatus 1-5. Actually, when the communication apparatus 1-2 receives a communication signal from the communication apparatus 1-1, a communication signal is transmitted also from each of the communication apparatuses 1-3 and 1-4. Such a communication signal becomes an interference wave component for the communication signal received from the communication apparatus 1-1.

Figure 2:
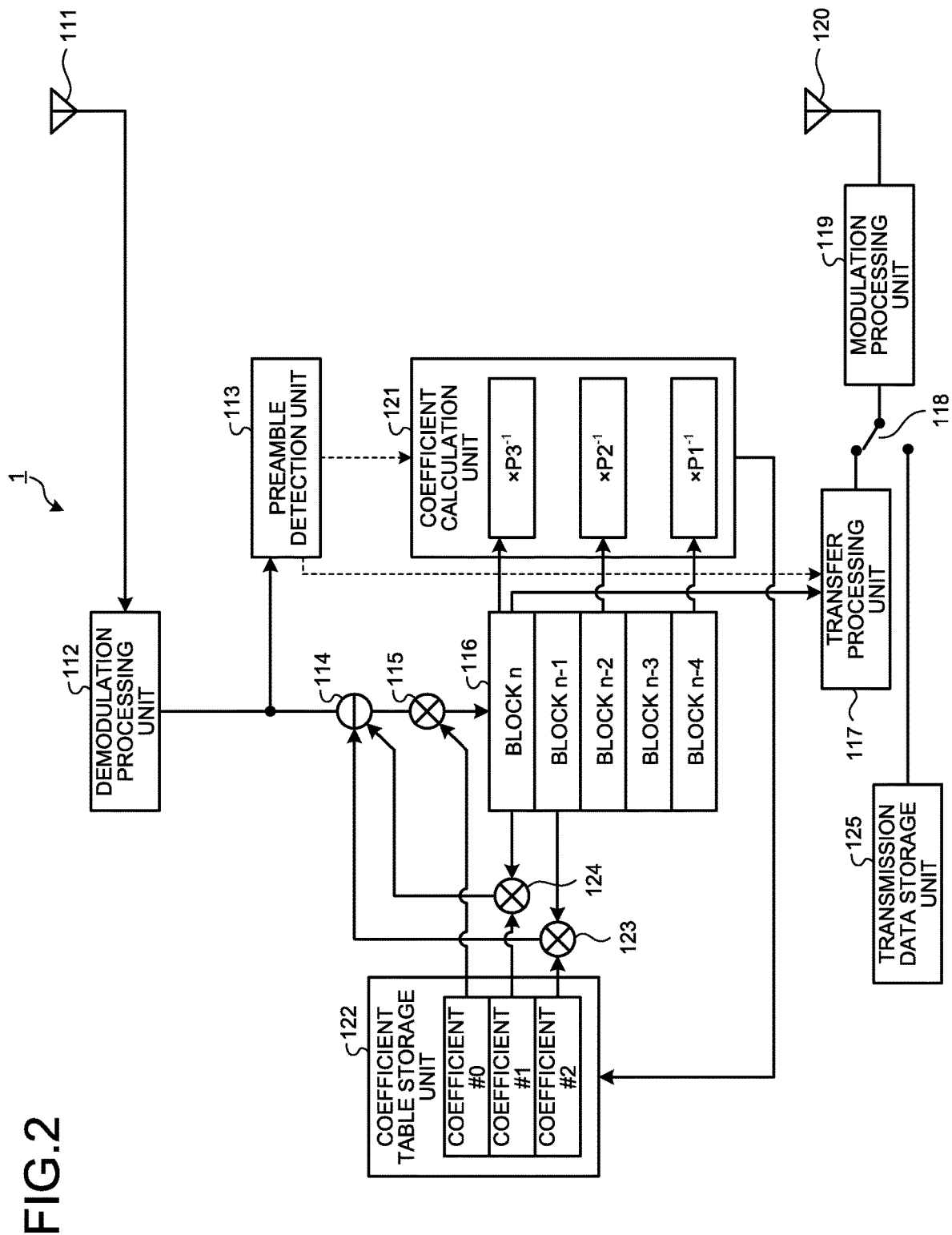
FIG. 2 is a diagram illustrating a functional configuration of a communication apparatus illustrated in FIG. 1.

FIG. 2 is a diagram illustrating a functional configuration of the communication apparatus 1 illustrated in FIG. 1. The communication apparatus 1 includes a receiving antenna 111, a demodulation processing unit 112, a preamble detection unit 113, a subtraction unit 114, a distortion correction unit 115, a buffer unit 116, a transfer processing unit 117, a transmission data switching unit 118, a modulation processing unit 119, a transmitting antenna 120, a coefficient calculation unit 121, a coefficient table storage unit 122, interference wave calculation units 123 and 124, and a transmission data storage unit 125. In the present embodiment, the maximum number of transfers that is the maximum number of times transfer of a message is allowed in the communication system 10 is two.

Figure 3:
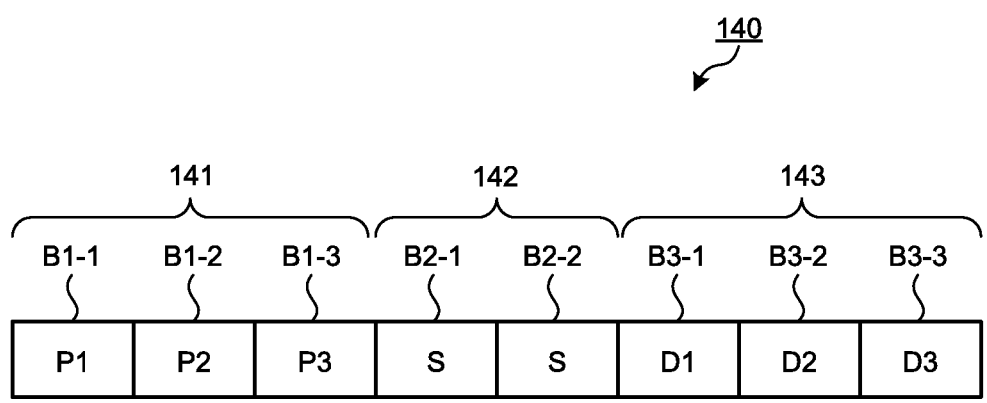
FIG. 3 is a diagram illustrating a signal format of a communication signal received by a receiving antenna illustrated in FIG. 2.

The receiving antenna 111 is a reception unit configured to receive a communication signal radiated into space as an electromagnetic wave. The receiving antenna 111 converts the received electromagnetic wave into electrical energy and outputs a communication signal 140 as the electrical energy to the demodulation processing unit 112. FIG. 3 is a diagram illustrating a signal format of the communication signal 140 received by the receiving antenna 111 illustrated in FIG. 2. The communication signal 140 includes a preamble portion 141, a space portion 142, and a data portion 143.

The preamble portion 141 includes preamble blocks B1-1 to B1-3, which are examples of a number of preamble blocks, the preamble blocks corresponding to signal regions defined for storing known preamble patterns P1 to P3, respectively. Hereinafter, when the preamble blocks B1-1, B1-2, and B1-3 are not necessarily distinguished from each other, they are referred to as a preamble block B1 or preamble blocks B1.

Each preamble block B1 is associated in advance with a preamble pattern to be stored. The preamble block B1-1 is associated with a preamble pattern P1, the preamble block B1-2 is associated with a preamble pattern P2, and the preamble block B1-3 is associated with a preamble pattern P3. The preamble patterns P1 to P3 are bit strings whose respective parts are different from each other at least. The preamble patterns P1 to P3 are bit strings predetermined in the communication system 10 and are used to synchronize communications.

The number of preamble blocks B1 is one larger than the maximum number of transfers. In the example of FIG. 3, the maximum number of transfers is two, so that the number of preamble blocks B1 is three. In that case, three blocks from a head block of the communication signal 140 are the preamble blocks B1.

The space portion 142 includes space blocks B2-1 and B2-2, each of which is a region for a space S in which no data is stored. Hereinafter, when the space blocks B2-1 and B2-2 do not need to be distinguished from each other, they are referred to as a space block B2 or space blocks B2. The number of space blocks B2 is equal to or greater than the maximum number of transfers. In the example of FIG. 3, the number of the space blocks B2 is the same as the maximum number of transfers.

The data portion 143 includes two or more data blocks B3-1 to B3-3 that are regions in which data sets D1 to D3 to be actually transmitted are stored. Hereinafter, when the data blocks B3-1, B3-2, and B3-3 do not need to be distinguished from each other, they are referred to as a data block B3 or data blocks B3.

The description is back to FIG. 2. The demodulation processing unit 112 performs a demodulation process on the communication signal 140 outputted by the receiving antenna 111 to convert the communication signal 140 into a symbol string, and outputs the symbol string obtained by the conversion to each of the preamble detection unit 113 and the subtraction unit 114 on a block basis.

The preamble detection unit 113 detects the known preamble patterns P1 to P3 from the symbol string outputted by the demodulation processing unit 112. The preamble detection unit 113 determines whether or not the predetermined preamble pattern P1, P2, or P3 is included in the symbol string. The preamble detection unit 113 notifies the transfer processing unit 117 and the coefficient calculation unit 121 of information indicating the detected preamble pattern P1, P2, or P3.

The subtraction unit 114 performs a subtraction process for canceling an interference wave component calculated by each of the interference wave calculation units 123 and 124 from the symbol string outputted by the demodulation processing unit 112. As will be described later, the buffer unit 116 has a plurality of buffer regions, and the latest reception block received at the last minute is referred to as a block n. The interference wave calculation unit 123 calculates an interference wave component using a block n-1 among the plurality of reception blocks stored in the buffer unit 116, and the interference wave calculation unit 124 calculates an interference wave component using the block n stored in the buffer unit 116. Therefore, the subtraction unit 114 cancels the interference wave component calculated using blocks corresponding to the last two blocks from the symbol string of the block that is currently being received, and outputs the symbol string from which the interference wave component has been canceled.

The distortion correction unit 115 performs a distortion correction process for correcting distortion of a signal for the symbol string outputted by the subtraction unit 114. The distortion correction unit 115 performs distortion correction by multiplying the symbol string by a value of a coefficient #0 of the coefficient table storage unit 122. In an initial state, the value of the coefficient #0 is "1", so that the distortion correction unit 115 does not affect the symbol string.

The symbol string outputted by the demodulation processing unit 112 is stored in the buffer unit 116 via the subtraction unit 114 and the distortion correction unit 115. The buffer unit 116 is a storage region in which a symbol string of the received communication signal 140 is stored on a block basis. The buffer unit 116 has buffer regions for five blocks.

When the preamble patterns detected by the preamble detection unit 113 are the predetermined preamble patterns P1 and P2, the transfer processing unit 117 changes a preamble pattern included in the communication signal 140 in accordance with a predetermined rule, and transfers the communication signal 140 having the preamble pattern changed. Changing a preamble pattern means changing a preamble pattern included in the communication signal 140 or a combination of preamble patterns by deleting or replacing the preamble pattern. The transfer processing unit 117 extracts the block n from the buffer unit 116, and outputs the block n to the modulation processing unit 119 as it is or after replacing the content of the extracted block n with a different content. The transfer processing unit 117 performs the above-described transfer process every time a new block is added to the buffer unit 116. Specifically, when the extracted block n is a first block in which the preamble pattern has been detected, the transfer processing unit 117 removes the preamble pattern from the first block to make the space S for it and outputs the block. When a second block that is a region to be received subsequent to the first block is the preamble block B1, the transfer processing unit 117 transfers the communication signal 140 in which a preamble block associated in advance with the second block is stored in the second block.

The transmission data switching unit 118 can select any state of a state where the symbol string outputted by the transfer processing unit 117 is inputted to the modulation processing unit 119 and a state where transmission data stored in the transmission data storage unit 125 is inputted to the modulation processing unit 119. When the transmission data switching unit 118 connects the modulation processing unit 119 and the transfer processing unit 117, the communication signal 140 received by the receiving antenna 111 can be transferred. When the transmission data switching unit 118 connects the modulation processing unit 119 and the transmission data storage unit 125, transmission data generated by the communication apparatus 1 can be transmitted.

The modulation processing unit 119 performs a modulation process for converting the input symbol string into a transmission signal that can be transmitted from the transmitting antenna 120. The modulation processing unit 119 outputs the after-conversion transmission signal to the transmitting antenna 120. The transmitting antenna 120 is a transmission unit that converts the transmission signal outputted by the modulation processing unit 119 into an electromagnetic wave and radiates the electromagnetic wave into space.

The coefficient calculation unit 121 calculates coefficients #0 to #2 to be used by the distortion correction unit 115, and the interference wave calculation units 123 and 124. The coefficient calculation unit 121 calculates an amplitude, a phase, and a reception timing of an interference wave on the basis of the preamble patterns stored in the buffer unit 116 and the known preamble patterns, and calculates the coefficients #0 to #2. The coefficient calculation unit 121 stores the calculated coefficients #0 to #2 in the coefficient table storage unit 122. For example, the coefficient calculation unit 121 can set, as the coefficients #0 to #2, a result obtained by dividing a symbol string of the preamble block B1 stored in the buffer unit 116 by a signal sequence of a known preamble pattern in a complex number domain.

The coefficient table storage unit 122 is a storage region for storing the coefficients #0 to #2. The coefficient table storage unit 122 can store the coefficients #0 to #2 calculated by the coefficient calculation unit 121. In the initial state, the value of the coefficient #0 is "1", and values of the coefficients #1 and #2 are "0".

The interference wave calculation units 123 and 124 each calculate an interference wave component using a coefficient table stored in the coefficient table storage unit 122 and a symbol string stored in the buffer unit 116. The interference wave calculation units 123 and 124 each output the calculated interference wave component to the subtraction unit 114. Specifically, the interference wave calculation unit 123 calculates an interference wave component using a symbol string of the block n-1 that is a block received immediately before the block n and the coefficient #2. The interference wave calculation unit 124 calculates an interference wave component using a symbol string of the block n and the coefficient #1.

The transmission data storage unit 125 is a storage region in which transmission data generated by the communication apparatus 1 is stored separately from the communication signal 140 to be relayed. When connected to the modulation processing unit 119, the transmission data storage unit 125 outputs transmission data to the modulation processing unit 119.

The functional configuration of the communication apparatus 1 has been described above, but the present embodiment is not limited to such an example. For example, although an example has been described in which the communication apparatus 1 performs low-power wireless communication, the technique of the present embodiment can be applied even to the communication apparatus 1 that performs optical space communication by replacing the receiving antenna 111 with a light receiving element and replacing the transmitting antenna 120 with a light emitting element. In the above description, the maximum number of transfers is two, but the present embodiment is not limited to such an example. It is possible to support various maximum numbers of transfers by changing the numbers of stages of the buffer unit 116, the coefficient calculation unit 121, and the coefficient table storage unit 122 and adjusting a format of a communication signal.

Figure 4:
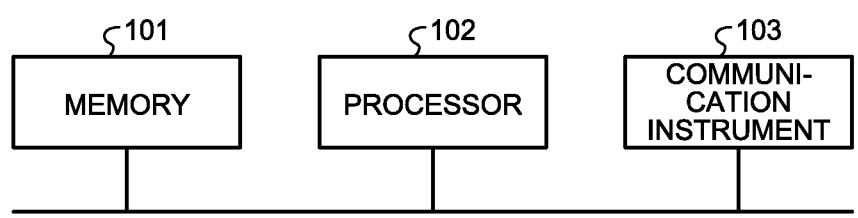
FIG. 4 is a diagram illustrating a hardware configuration of the communication apparatus illustrated in FIG. 2.

FIG. 4 is a diagram illustrating a hardware configuration of the communication apparatus 1 illustrated in FIG. 2.

Functions of the communication apparatus 1 can be realized using a memory 101, a processor 102, and a communication instrument 103. Functions of the preamble detection unit 113, the subtraction unit 114, the distortion correction unit 115, the buffer unit 116, the transfer processing unit 117, the transmission data switching unit 118, the coefficient calculation unit 121, the coefficient table storage unit 122, the interference wave calculation units 123 and 124, and the transmission data storage unit 125 are realized by the processor 102 reading and executing a computer program stored in the memory 101. In addition, functions of the receiving antenna 111, the demodulation processing unit 112, the modulation processing unit 119, and the transmitting antenna 120 are realized by the communication instrument 103.

The memory 101 is, for example, a nonvolatile or volatile semiconductor memory such as a random access memory (RAM), a read only memory (ROM), a flash memory, an erasable programmable ROM (EPROM), or an electrically EPROM (EEPROM) (registered trademark), a magnetic disk, or the like. The memory 101 is also used as a temporary memory for each process to be executed by the processor 102.

The processor 102 is a central processing unit (CPU), and also referred to as a central processing device, a processing device, an arithmetic device, a microprocessor, a microcomputer, a digital signal processor (DSP) or the like.

The communication instrument 103 has a function for communicating with other communication apparatuses 1. The communication instrument 103 includes an antenna and a processing circuit for performing a process accompanied with communication.

Figure 5:
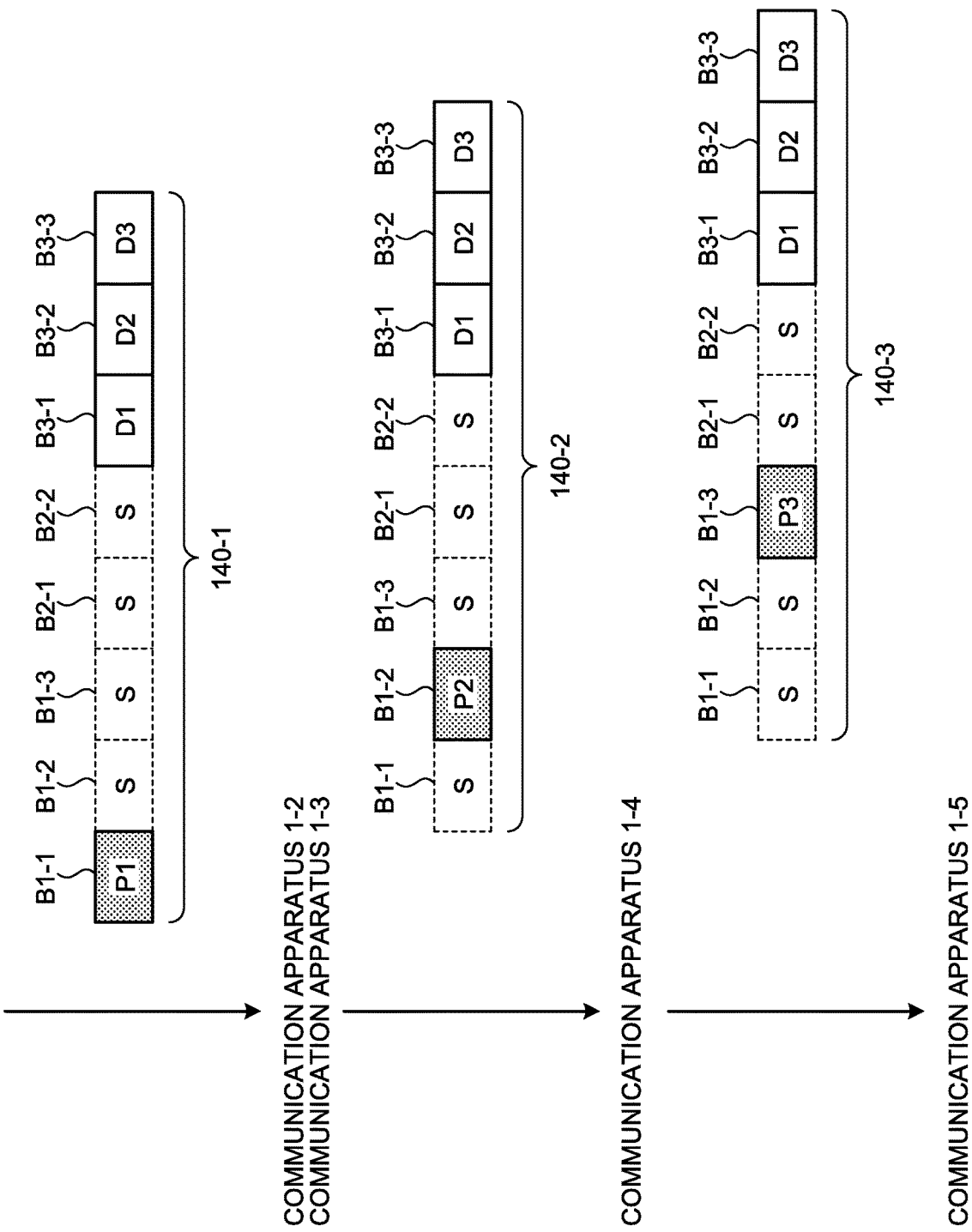
FIG. 5 is a diagram illustrating an example of the communication signal transmitted by each communication apparatus in the communication system illustrated in FIG. 1.

Here, a state of the communication signal 140 transmitted in the communication system 10 illustrated in FIG. 1 will be described. FIG. 5 is a diagram illustrating an example of the communication signal 140 transmitted by each communication apparatus 1 in the communication system 10 illustrated in FIG. 1. FIG. 5 illustrates an example in which a message is transmitted from the communication apparatus 1-1 to the communication apparatus 1-5.

The communication apparatus 1-1 generates a communication signal 140-1 in which the preamble pattern P1 is stored in the leading preamble block B1-1, and the other preamble blocks B1-2 and B1-3 are formed of the spaces S, and transmits the generated communication signal 140-1 to the communication apparatuses 1-2 and 1-3.

When receiving the communication signal 140-1, each of the communication apparatuses 1-2 and 1-3 searches the preamble blocks B1-1 to B1-3 for the predetermined preamble patterns P1 to P3. In the example illustrated in FIG. 5, the preamble pattern P1 is detected. Each of the communication apparatuses 1-2 and 1-3 removes the preamble pattern P1 from the preamble block B1-1 that is the first block in which the detected preamble pattern P1 is stored. Then, when the second block that is a region to be received subsequent to the preamble block B1-1 is the preamble block B1, a preamble pattern associated in advance with the second block is stored.

In the example of FIG. 5, the second block is the preamble block B1-2, so that the communication signal 140-2 in which the preamble pattern P2 is stored in the preamble block B1-2 is transferred to the communication apparatus 1-4. Since each of the communication apparatuses 1-2 and 1-3 removes the preamble pattern P1 from the preamble block B1-1 and stores the preamble pattern P2 in the preamble block B1-2, the preamble blocks B1 other than the preamble block B1-2 of the communication signal 140-2 are the spaces S.

When receiving the communication signal 140-2, the communication apparatus 1-4 searches the preamble blocks B1 for the predetermined preamble patterns P1 to P3, and detects the preamble pattern P2. The communication apparatus 1-4 removes the preamble pattern P2 from the preamble block B1-2 that is the first block in which the detected preamble pattern P2 is stored. Then, when the second block that is a region to be received subsequent to the preamble block B1-2 is the preamble block B1, a preamble pattern associated in advance with the second block is stored.

In the example of FIG. 5, the second block is the preamble block B1-3, so that the communication signal 140-3 in which the preamble pattern P3 is stored in the preamble block B1-3 is transferred to the communication apparatus 1-5. Since the communication apparatus 1-4 removes the preamble pattern P2 from the preamble block B1-2 and stores the preamble pattern P3 in the preamble block B1-3, the preamble blocks B1 other than the preamble block B1-3 of the communication signal 140-3 are the spaces S.

When receiving the communication signal 140-3, the communication apparatus 1-5 searches the preamble blocks B1 for the predetermined preamble patterns P1 to P3, and detects the preamble pattern P3. The second block is not the preamble block B1, the second block being a region to be received subsequent to the preamble block B1-3 that is the first block in which the detected preamble pattern P3 is stored. Therefore, the communication apparatus 1-5 does not transfer the received communication signal 140-3.

Figure 6:
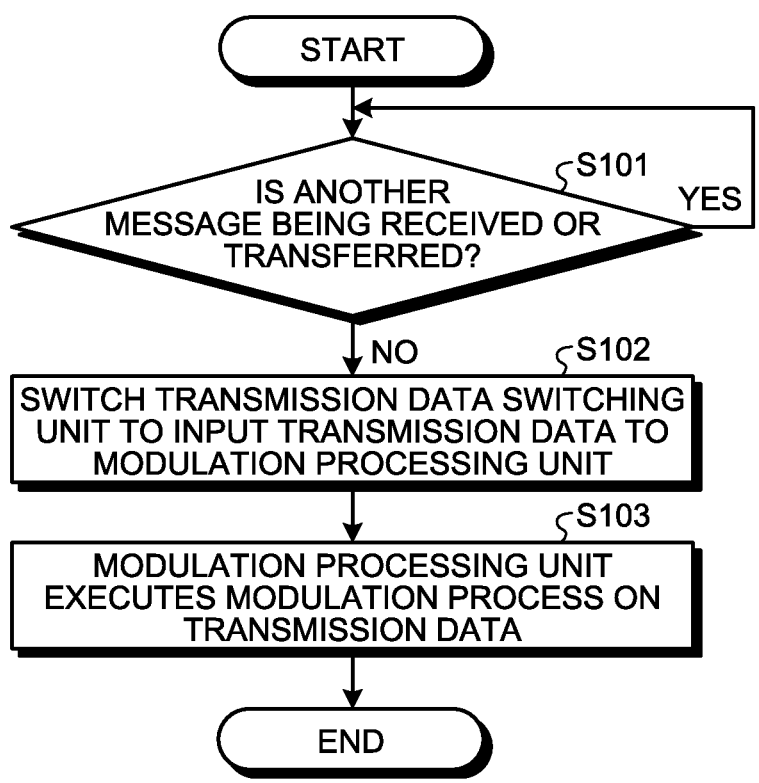
FIG. 6 is a flowchart illustrating an operation in which the communication apparatus illustrated in FIG. 2 transmits a generated communication signal.

An operation of each communication apparatus 1 for realizing the function of the communication system 10 as described above will be described. FIG. 6 is a flowchart illustrating an operation in which the communication apparatus 1 illustrated in FIG. 2 transmits a generated communication signal 140. The operation illustrated in FIG. 6 is executed by the communication apparatus 1 as a transmission source configured to generate the communication signal 140, and therefore corresponds to the operation of the communication apparatus 1-1 in the example of the communication system 10 in FIG. 1.

When there is data to be transmitted in the transmission data storage unit 125, the communication apparatus 1 starts the operation illustrated in FIG. 6. The communication apparatus 1 checks whether another message is currently being received or transferred (Step S101). In a case where another message is being received or transferred (Step S101: Yes), the communication apparatus 1 repeats the operation in Step S101.

In a case where another message is not being received nor transferred (Step S101: No), the communication apparatus 1 switches the transmission data switching unit 118 to input the transmission data stored in the transmission data storage unit 125 to the modulation processing unit 119 (Step S102).

The modulation processing unit 119 of the communication apparatus 1 executes a modulation process on the input transmission data (Step S103). The transmission data after the modulation process is transmitted via the transmitting antenna 120.

Figure 7:
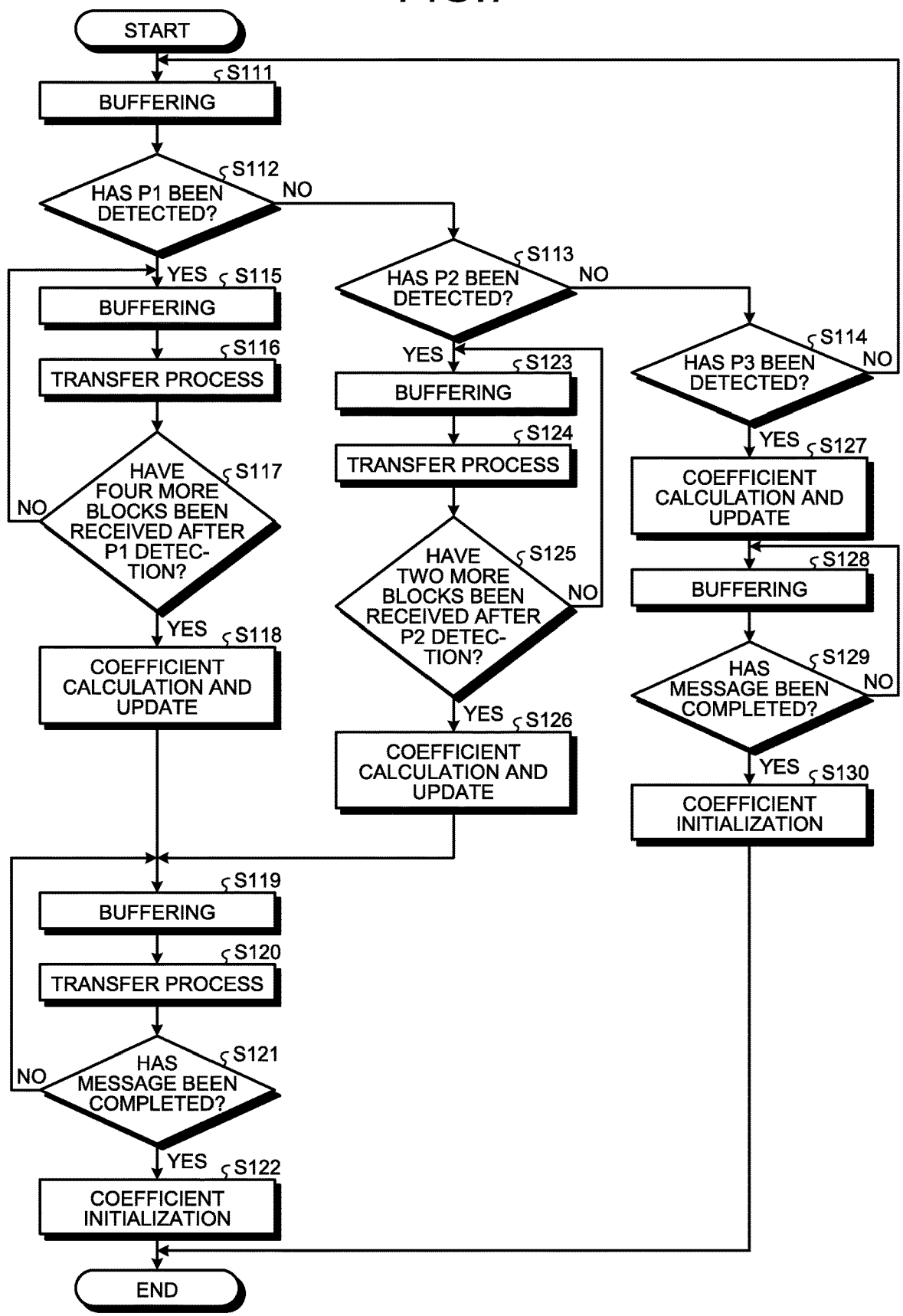
FIG. 7 is a flowchart illustrating an operation when the communication apparatus illustrated in FIG. 2 receives the communication signal.

FIG. 7 is a flowchart illustrating an operation when the communication apparatus 1 illustrated in FIG. 2 has received the communication signal 140. The operation illustrated in FIG. 7 is executed by a relay device that relays the communication signal 140 or a receiving device as a transmission destination of the communication signal 140, and therefore corresponds to the operation of the communication apparatuses 1-2, 1-3, 1-4, and 1-5 in the example of the communication system 10 in FIG. 1.

When activating a reception function, the communication apparatus 1 starts the operation illustrated in FIG. 7. When activating the reception function, the communication apparatus 1 starts a buffering process (Step S111). The buffering process includes a process in which the demodulation processing unit 112 continuously performs a demodulation process on the communication signal 140 received via the receiving antenna 111 to convert the communication signal 140 into a symbol string, and a process in which the demodulation processing unit 112 transmits the converted symbol string on a block basis to the buffer unit 116 via the subtraction unit 114 and the distortion correction unit 115. The value of the coefficient #0 stored in the coefficient table storage unit 122 is "1" and the values of the coefficients #1 and #2 are "0" in the initial state and after the message transmission. Therefore, the subtraction unit 114 and the distortion correction unit 115 do not change the symbol string outputted by the demodulation processing unit 112.

The symbol string is also inputted to the preamble detection unit 113. The preamble detection unit 113 searches the input symbol string for the known preamble pattern P1. Then, the preamble detection unit 113 determines whether or not the preamble pattern P1 has been detected (Step S112).

In a case where the preamble pattern P1 has not been detected (Step S112: No), the preamble detection unit 113 subsequently searches for the preamble pattern P2 and determines whether or not the preamble pattern P2 has been detected (Step S113).

In a case where the preamble pattern P2 has not been detected (Step S113: No), the preamble detection unit 113 subsequently searches for the preamble pattern P3 and determines whether or not the preamble pattern P3 has been detected (Step S114). In a case where the preamble pattern P3 has not been detected (Step S114: No), the buffering process in Step S111 is continued.

In a case where the preamble pattern P1 has been detected (Step S112: Yes), the communication apparatus 1 starts a transfer procedure for a communication signal. Specifically, the transmission data switching unit 118 is switched to the transfer processing unit 117. The demodulation processing unit 112 continues the buffering process (Step S115). Each time a new block is added to the buffer unit 116, the transfer processing unit 117 performs a transfer process for outputting the newest block stored in the buffer unit 116 to the modulation processing unit 119 (Step S116). In the transfer process, the transfer processing unit 117 can replace the content of the block extracted from the buffer unit 116 and output the resultant block to the modulation processing unit 119. Specifically, the transfer processing unit 117 removes the detected preamble pattern P1 from the preamble block B1-1, stores the preamble pattern P2 in the preamble block B1-2 that is a block to be received subsequent to the preamble block B1-1, and outputs the preamble block B1-2 to the modulation processing unit 119.

The demodulation processing unit 112 determines whether or not additional four blocks have been received from the block in which the preamble pattern P1 has been detected (Step S117). In a case where the additional four blocks have not been received from the block in which the preamble pattern P1 has been detected (Step S117: No), the demodulation processing unit 112 performs the buffering process in Step S115, and the transfer processing unit 117 performs the transfer process in Step S116. Until the four more blocks are received from the block in which the preamble pattern P1 has been detected, the buffering process in Step S115 and the transfer process in Step S116 are repeated five times in total.

In a case where the four more blocks have been received from the block in which the preamble pattern P1 has been detected (Step S117: Yes), the coefficient calculation unit 121 performs a coefficient calculation and an update process (Step S118). At the time when Step S118 is executed, the preamble pattern P1 is stored in the block n-4 of the buffer unit 116, the preamble pattern P2 is stored in the block n-2, and the preamble pattern P3 is stored in the block n. Blocks other than the block n-4, the block n-2, and the block n are the spaces S.

The coefficient calculation unit 121 calculates the coefficients #0 to #2 using the three received preamble patterns P1 to P3 stored in the buffer unit 116 and the known preamble patterns P1 to P3, and updates the values of the coefficients #0 to #2 in the coefficient table stored in the coefficient table storage unit 122. The coefficient calculation unit 121 can set, as the coefficients #0 to #2, a result obtained by dividing the symbol string of the preamble block B1 stored in the buffer unit 116 by a signal sequence of a known preamble pattern in a complex number domain.

Specifically, the coefficient calculation unit 121 sets, as the coefficient #0, a result obtained by dividing the preamble pattern P1 stored in the block n-4 of the buffer unit 116 by the known preamble pattern P1. The coefficient calculation unit 121 sets, as the coefficient #1, a result obtained by dividing the preamble pattern P2 stored in the block n-2 of the buffer unit 116 by the known preamble pattern P2. The coefficient calculation unit 121 sets, as the coefficient #2, a result obtained by dividing the preamble pattern P3 stored in the block n of the buffer unit 116 by the known preamble pattern P3. Thereafter, in the communication apparatus 1, the interference wave component calculated from the blocks corresponding to immediately preceding two blocks stored in the buffer unit 116 is canceled by the subtraction unit 114 with respect to the symbol string outputted by the demodulation processing unit 112, and then the distortion correction unit 115 performs multiplication by the value of the coefficient #0 stored in the coefficient table storage unit 122, thereby performing the distortion correction process.

After the coefficient calculation and update process, a buffering process (Step S119) and a transfer process (Step S120) are executed. In the communication apparatus 1, the buffering process in Step S119 is basically the same process as that in Step S115. Because the coefficient has been updated at the time of executing the buffering process in Step S119, the interference wave component is canceled by the subtraction unit 114, and a result of the distortion correction performed by the distortion correction unit 115 is stored in the buffer unit 116.

While the communication apparatus 1-2 is receiving data D3 from the communication apparatus 1-1, the communication apparatuses 1-2 and 1-3 are transmitting data D2, and the communication apparatus 1-4 is transmitting data D1. For this reason, the data block B3-3 being received by the communication apparatus 1-2 has the data D1 and the data D2 contained therein as interference signals. The subtraction unit 114 calculates and cancels interference wave component using the received data D1 and data D2 and the coefficients stored in the coefficient table storage unit 122.

The communication apparatus 1 determines whether or not reception of a message has been completed (Step S121). In a case where the reception of the message has not been completed (Step S121: No), the communication apparatus 1 repeats the processes in Steps S119 and S120. In a case where the reception of the message has been completed (Step S121: Yes), the coefficient calculation unit 121 initializes the coefficients #0 to #2 stored in the coefficient table storage unit 122 to set the value of the coefficient #0 to "1" and the values of the coefficients #1 and #2 to "0" (Step S122).

In a case where the preamble pattern P2 has been detected (Step S113: Yes), the communication apparatus 1 performs a transfer procedure for a communication signal. The transfer procedure includes a buffering process (Step S123) and a transfer process (Step S124). The buffering process in Step S123 is similar to the buffering process in Step S115, and the transfer process in Step S124 is similar to the transfer process in Step S116. After the transfer process, the demodulation processing unit 112 determines whether or not two more blocks have been received after the detection of the preamble pattern P2 (Step S125). The buffering process in Step S123 and the transfer process in Step S124 are repeated three times until the two more blocks are received after the detection of the preamble pattern P2 (Step S125: No). In a case where the two more blocks have been received after the detection of the preamble pattern P2 (Step S125: Yes), the coefficient calculation unit 121 performs a coefficient calculation and an update process (Step S126).

At the time when the coefficient calculation and update process in Step S126 is executed, the preamble pattern P2 is stored in the block n-2 of the buffer unit 116, the preamble pattern P3 is stored in the block n, and the other blocks are spaces. The coefficient calculation unit 121 can calculate coefficients using the preamble patterns P2 and P3 stored in the buffer unit 116, and the known preamble patterns P2 and P3. Specifically, the coefficient calculation unit 121 sets, as the coefficient #0, a result obtained by dividing the preamble pattern P2 stored in the block n-2 by the known preamble pattern P2, and sets, as the coefficient #1, a result obtained by dividing the preamble pattern P3 stored in the block n by the known preamble pattern P3. Furthermore, the coefficient calculation unit 121 sets the value of coefficient #2 to "0". After the coefficient calculation and update process in Step S126, the processes in Steps S119 to S122 are executed.

In a case where the preamble pattern P3 has been detected (Step S114: Yes), the coefficient calculation unit 121 executes a coefficient calculation and an update process (Step S127). At the time when the coefficient calculation and the update process in Step S127 are executed, the preamble pattern P3 is stored in the block n of the buffer unit 116, and the other blocks are spaces. The coefficient calculation unit 121 sets, as the coefficient #0, a result obtained by dividing the preamble pattern P3 stored in the block n of the buffer unit 116 by the known preamble pattern P3, and sets the values of the coefficients #1 and #2 to "0". The coefficient calculation unit 121 stores the calculated coefficients #0 to #2 in the coefficient table storage unit 122.

When the coefficient calculation and the update process in Step S127 are completed, the demodulation processing unit 112 performs a buffering process (Step S128). The buffering process in Step S128 is similar to that in Step S115. Thereafter, the communication apparatus 1 does not perform the transfer process but determines whether or not the reception of the message has been completed (Step S129). In a case where the reception of the message has not been completed (Step S129: No), the buffering process in Step S128 is repeated. In a case where the reception of the message has been completed (Step S129: Yes), the coefficient calculation unit 121 initializes the coefficients #0 to #2 (Step S130). The coefficient initialization process in Step S130 is similar to the coefficient initialization process in Step S122.

As described above, the communication apparatus 1 can determine whether or not to transfer the received communication signal 140 on the basis of the data stored in the preamble block B1. Since the preamble block B1 is placed at the head of the communication signal 140, it is possible to quickly determine whether or not transfer is necessary by viewing at the head of the communication signal 140, so that the number of transfers can be limited and a transmission delay can be minimized.

In addition, when transferring the communication signal 140, the communication apparatus 1 replaces the first block in which the received preamble pattern is stored with a space, and stores, in the second block, a preamble pattern associated with the second block to be received subsequent to the first block. The communication signal 140 transferred at that time includes one preamble pattern, and the other preamble blocks B1 are spaces, so that it is possible to sequentially cancel the interference wave component caused by the transfer.

Second Embodiment

Figure 8:
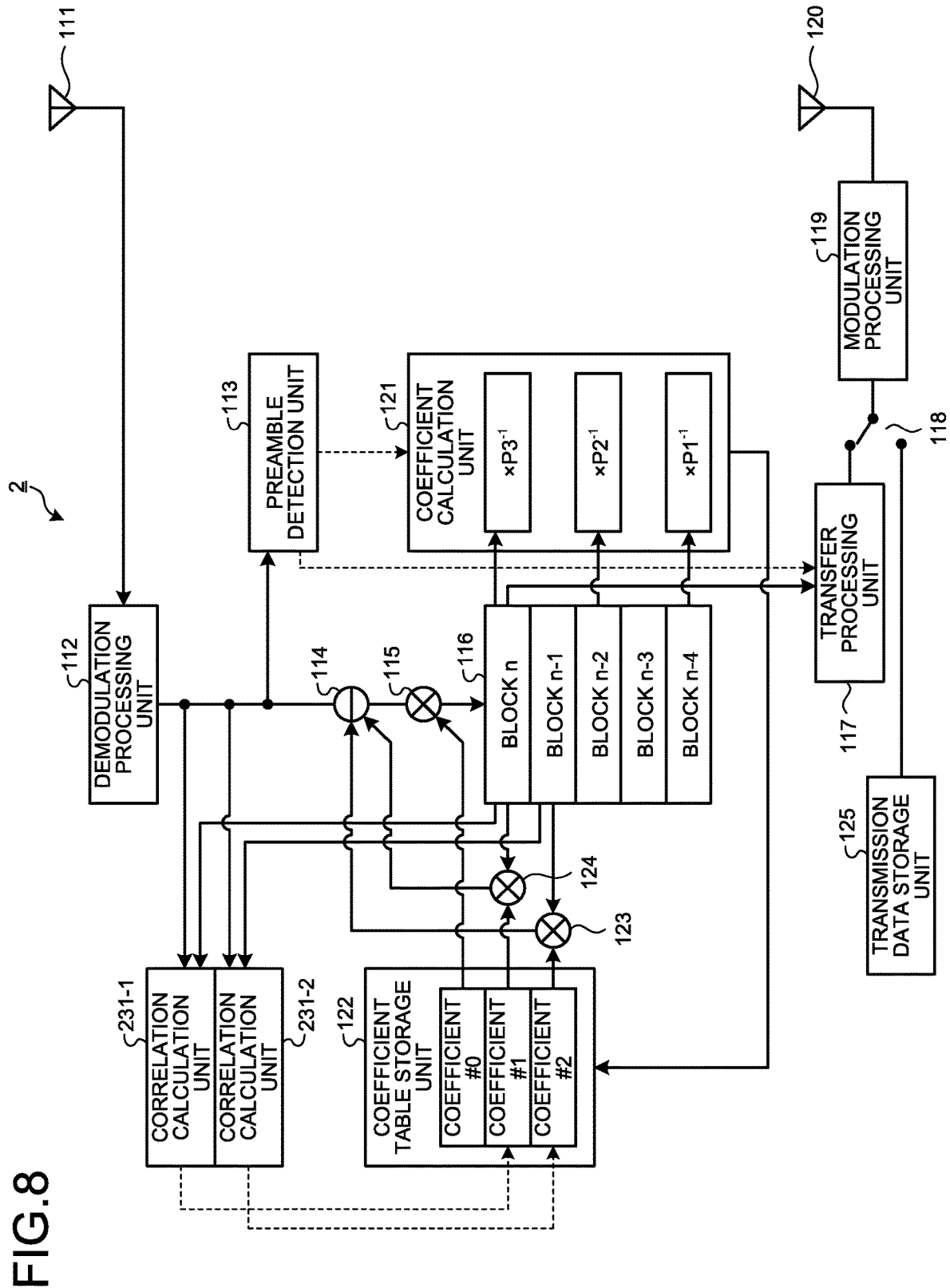
FIG. 8 is a diagram illustrating a functional configuration of a communication apparatus according to a second embodiment of the present invention.

FIG. 8 is a diagram illustrating a functional configuration of a communication apparatus 2 according to a second embodiment of the present invention. The components similar to those in the first embodiment are denoted by the same reference signs, and thereby descriptions thereof will be omitted. Hereinafter, portions different from those in the first embodiment will be mainly described.

The communication apparatus 2 includes correlation calculation units 231-1 and 231-2 in addition to the configuration of the communication apparatus 1. The correlation calculation units 231-1 and 231-2 update values of the coefficients #1 and #2 while the data portion 143 of the communication signal 140 is received. Specifically, the correlation calculation units 231-1 and 231-2 estimate phase information of an interference wave component on the basis of a symbol string of the data portion 143 stored in the buffer unit 116 and a symbol string including an interference wave component outputted by the demodulation processing unit 112, and correct the values of the coefficients #1 and #2 on the basis of a result of the estimation. The correlation calculation units 231-1 and 231-2 use values of the coefficients #1 and #2 after the correction to update values of the coefficients #1 and #2 stored in the coefficient table storage unit 122.

The interference wave calculation units 123 and 124 of the communication apparatus 2 calculate an wave interference component using the updated values of the coefficients #1 and #2. Therefore, the subtraction unit 114 performs a subtraction process using the interference wave component calculated on the basis of correlations calculated by the correlation calculation units 231-1 and 231-2. In that case, the subtraction unit 114 removes the interference wave component from the communication signal 140 that is currently being received, using both the preamble block B1 that has already been received and the data block B3 that has already been received.

Similarly to the communication apparatus 1 of the first embodiment, functions of the communication apparatus 2 can be realized using the memory 101, the processor 102, and the communication instrument 103 illustrated in FIG. 4. Functions of the correlation calculation units 231-1 and 231-2 are realized by the processor 102 reading and executing a computer program stored in the memory 101.

Figure 9:
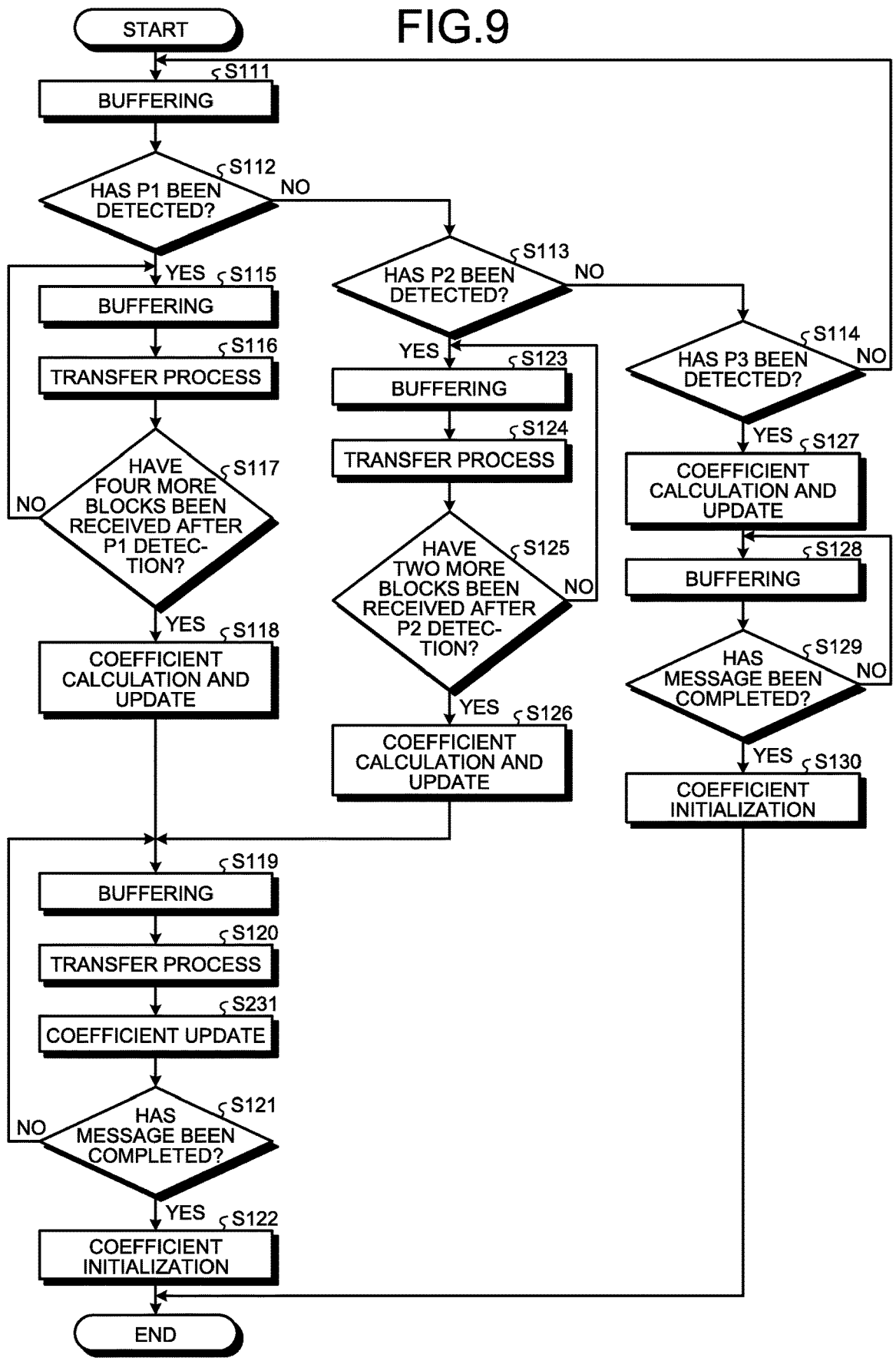
FIG. 9 is a flowchart illustrating an operation when the communication apparatus illustrated in FIG. 8 receives the communication signal.

FIG. 9 is a flowchart illustrating an operation when the communication apparatus 2 illustrated in FIG. 8 has received the communication signal 140. When activating a reception function, the communication apparatus 2 starts the operation illustrated in FIG. 9. While receiving the data portion 143 of the communication signal 140, the communication apparatus 1 according to the first embodiment repeats the buffering process in Step S119 and the transfer process in Step S120. The communication apparatus 2 performs a coefficient update process in addition to the processes in Steps S119 and S120 (Step S231).

The communication apparatuses 2-1, 2-2, 2-3, 2-4, and 2-5, which are examples of the communication apparatus 2, can constitute a communication system 20 having a configuration similar to that of the communication system 10 illustrated in FIG. 1. When the communication apparatus 2-2 is receiving, from the communication apparatus 2-1, the data block B3-3 in which the data D3 is stored, the communication apparatus 2-2 is simultaneously receiving the data block B3-2 including the data D2 transmitted by the communication apparatus 2-3 and the data block B3-1 including the data D1 transmitted by the communication apparatus 2-4. At the time when the communication apparatus 2-2 receives the data D3 from the communication apparatus 2-1, the data D1 and the data D2 are known information and are stored in the block n-1 and the block n of the buffer unit 116, respectively.

The correlation calculation unit 231-1 calculates a phase of an interference wave component corresponding to the data D2 using the data D2 stored in the block n of the buffer unit 116 and the symbol string including an interference wave component outputted by the demodulation processing unit 112, and corrects a phase of the coefficient #1 stored in the coefficient table storage unit 122 using the calculated phase. Similarly, the correlation calculation unit 231-2 calculates a phase of an interference wave component of the data D1 using the data D1 stored in the block n-1 of the buffer unit 116 and the symbol string including an interference wave component outputted by the demodulation processing unit 112, and corrects a phase of the coefficient #2 stored in the coefficient table storage unit 122 using the calculated phase.

As a coefficient correction method, for example, there is a method in which phase components of the coefficients #1 and #2 are replaced with phase components calculated by the correlation calculation units 231-1 and 231-2. Alternatively, as a correction method, there is a method in which a coefficient is gradually corrected using weighting. As the method using weighting, for example, there is a method in which, for example, when a weight w is a value of 1 or less, a result obtained by multiplying a phase component of a coefficient stored in the coefficient table storage unit 122 by 1−w and a result obtained by multiplying a phase component calculated by the demodulation processing unit 112 by w are added together.

The communication apparatus 2 according to the second embodiment sequentially corrects the phase components of the coefficients #1 and #2 even while receiving the data portion 143, thereby making it possible to maintain performance of removing an interference wave component even when a signal phase is gradually shifted after receiving the preamble portion 141.

Third Embodiment

Figure 10:
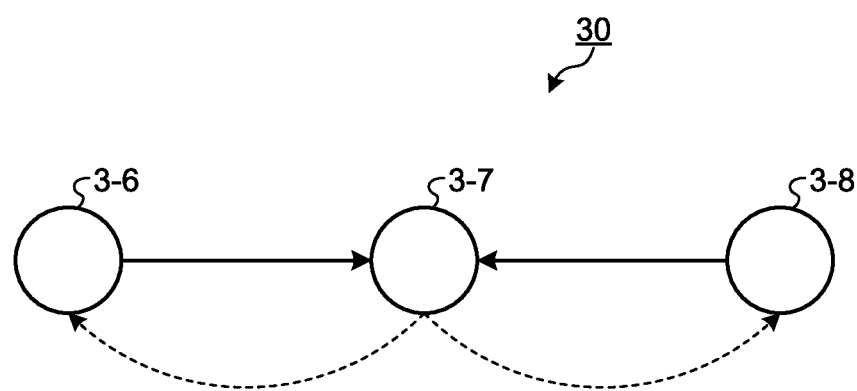
FIG. 10 is a diagram illustrating a configuration of a communication system according to a third embodiment of the present invention.

FIG. 10 is a diagram illustrating a configuration of a communication system 30 according to a third embodiment of the present invention. The communication system 30 includes communication apparatuses 3-6, 3-7, and 3-8. Hereinafter, when the communication apparatuses 3-6, 3-7, and 3-8 are not distinguished from each other, they are referred to as a communication apparatus 3 or communication apparatuses 3. The communication apparatus 3-6 can communicate with the communication apparatus 3-7. The communication apparatus 3-7 can communicate with the communication apparatuses 3-6 and 3-8. The communication apparatus 3-8 can communicate with the communication apparatus 3-7. The communication apparatuses 3-6 and 3-8 have a hidden-terminal relationship in which each of the apparatuses 3-6 and 3-8 is located out of the other's communication range.

In the third embodiment, the communication apparatuses 3-6 and 3-8, which are in a hidden-terminal relationship, simultaneously transmit messages to the communication apparatus 3-7, and when there occurs a collision of the messages in the communication apparatus 3-7, the communication apparatuses 3 that are sources of the messages is notified of the occurrence of the collision.

Figure 11:
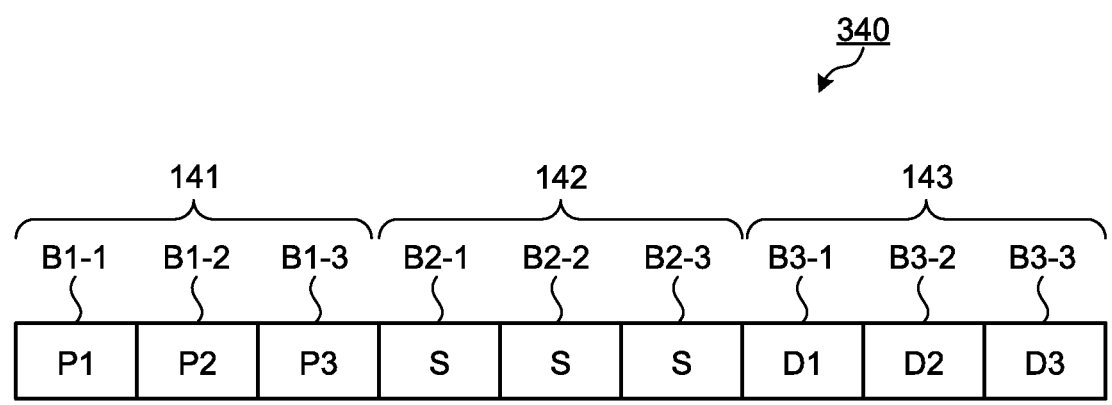
FIG. 11 is a diagram illustrating a signal format of a communication signal transmitted in the communication system illustrated in FIG. 10.

FIG. 11 is a diagram illustrating a signal format of a communication signal 340 transmitted in the communication system 30 illustrated in FIG. 10. The communication signal 340 includes the preamble portion 141, the space portion 142, and the data portion 143. In the first embodiment, the number of space blocks B2 in the space portion 142 is the maximum number of transfers, but in the third embodiment, the number of space blocks B2 in the space portion 142 is larger than the maximum number of transfers, for example, is the maximum number of transfers plus one. In the example of FIG. 11, the maximum number of transfers is two, and so the number of space blocks B2 is three. In other words, the communication signal 340 is obtained by adding the space block B2-3 to the communication signal 140. As will be described later, the increased space blocks B2 are used for notification of the occurrence of the collision.

Figure 12:
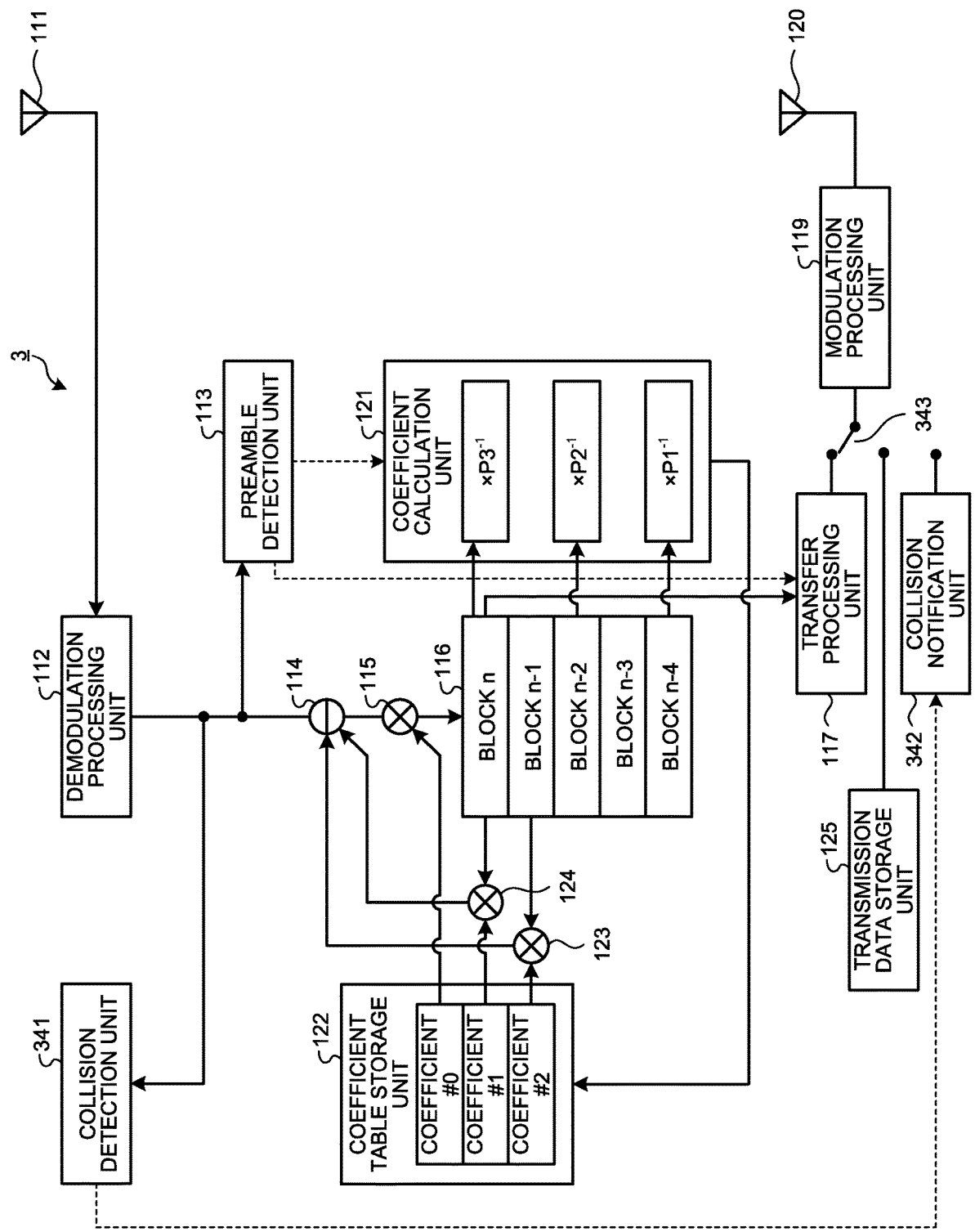
FIG. 12 is a diagram illustrating a functional configuration of a communication apparatus illustrated in FIG. 10.

FIG. 12 is a diagram illustrating a functional configuration of the communication apparatus 3 illustrated in FIG. 10. The communication apparatus 3 has functions of a collision detection unit 341 and a collision notification unit 342 in addition to the functions of the communication apparatus 1 of the first embodiment. In addition, the communication apparatus 3 includes a transmission data switching unit 343 instead of the transmission data switching unit 118 of the communication apparatus 1.

The collision detection unit 341 detects a collision of the preamble portions 141 of messages on the basis of a symbol string outputted by the demodulation processing unit 112. When detecting occurrence of the collision of the preamble portions 141, the collision detection unit 341 transmits the occurrence of the collision to the collision notification unit 342. When the collision detection unit 341 detects the occurrence of the collision, the collision notification unit 342 generates a collision notification signal that notifies the surrounding communication apparatuses 3 of the collision. The transmission data switching unit 343 selects data to be inputted to the modulation processing unit 119 from among outputs of the transfer processing unit 117, the transmission data storage unit 125, and the collision notification unit 342, and performs switching to the selected data. When the collision notification unit 342 generates a collision notification signal 363, the transmission data switching unit 343 inputs the output of the collision notification unit 342 to the modulation processing unit 119.

Similarly to the communication apparatus 1 of the first embodiment, functions of the communication apparatus 3 can be realized using the memory 101, the processor 102, and the communication instrument 103 illustrated in FIG. 4. Functions of the collision detection unit 341 and the collision notification unit 342 are realized by the processor 102 reading and executing a computer program stored in the memory 101.

Figure 13:
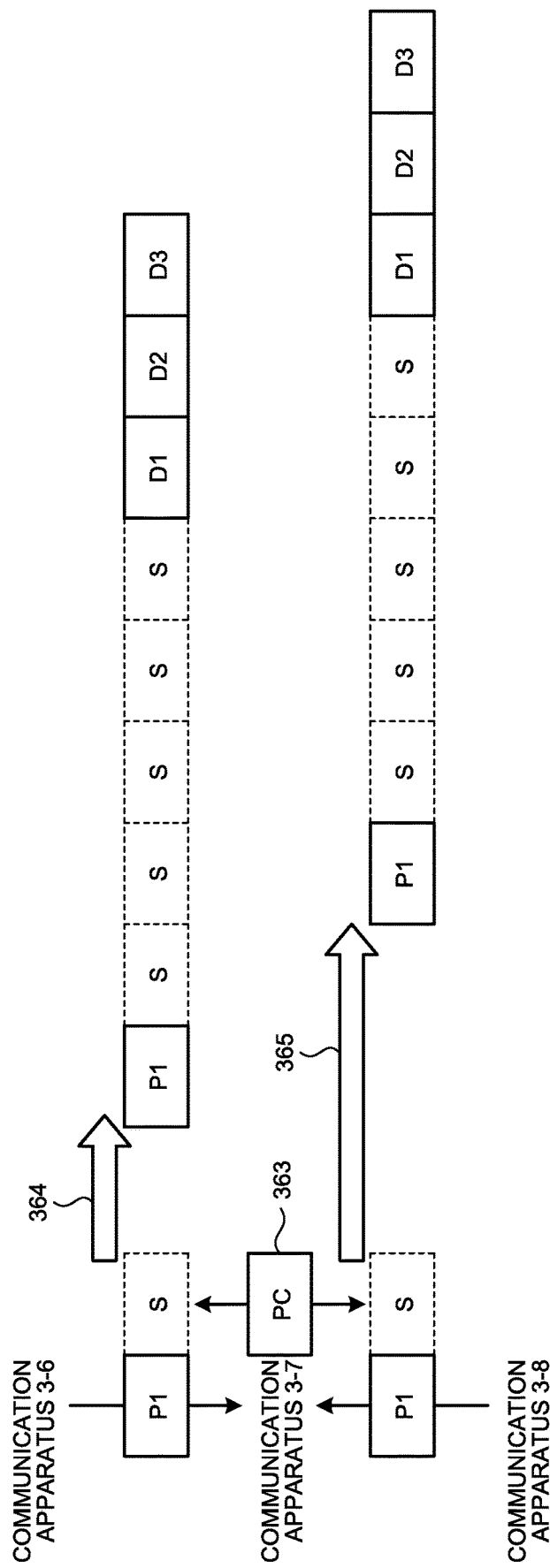
FIG. 13 is a diagram illustrating an example of communication timing in the communication system illustrated in FIG. 10.

FIG. 13 is a diagram illustrating an example of communication timing in the communication system 30 illustrated in FIG. 10. When the communication signals 340 transmitted by the communication apparatuses 3-6 and 3-8 which are in a hidden-terminal relationship to the communication apparatus 3-7 reach the communication apparatus 3-7 at the same time, the collision detection unit 341 of the communication apparatus 3-7 detects the occurrence of a collision and generates the collision notification signal 363 including a message PC making notification of the occurrence of the collision. The communication apparatus 3-7 transmits the generated collision notification signal 363 to the communication apparatuses 3-6 and 3-8 using the space S.

When each of the communication apparatuses 3-6 and 3-8 receives the collision notification signal 363, the collision detection unit 341 of each of the communication apparatuses 3-6 and 3-8 stops transmitting the communication signal 340 being transmitted. Thereafter, the communication apparatus 3-6 waits during a waiting time 364 and then retransmits the communication signal 340. The communication apparatus 3-8 waits during a waiting time 365, and then retransmits the communication signal 340. At that time, the waiting time 364 and the waiting time 365 are set to random times with different lengths so that retransmission timings do not overlap with each other.

Figure 14:
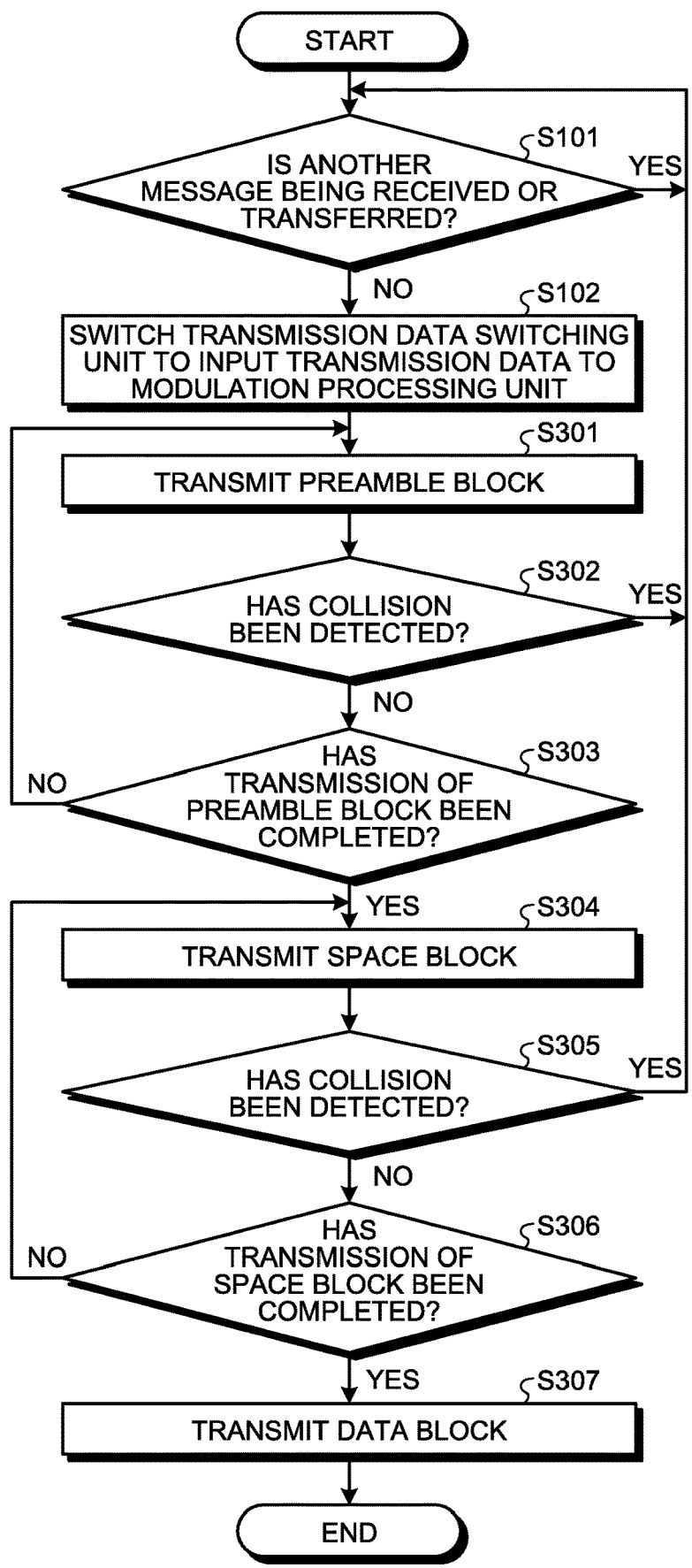
FIG. 14 is a flowchart illustrating an operation when the communication apparatus illustrated in FIG. 12 transmits a message.

FIG. 14 is a flowchart illustrating an operation when the communication apparatus 3 illustrated in FIG. 12 transmits a message. Because Steps S101 and S102 are similar to those in FIG. 6, descriptions thereof will be omitted. In Step S102, the communication apparatus 3 switches the transmission data switching unit 343 to the transmission data storage unit 125, and then the modulation processing unit 119 transmits the preamble block B1 of the transmission data (Step S301). While the preamble block B1 is transmitted, the collision detection unit 341 determines whether or not a collision has been detected on the basis of whether or not the collision notification signal 363 has been received (Step S302). In a case where the collision has been detected (Step S302: Yes), the modulation processing unit 119 stops transmitting the message and returns to the process in Step S101.

In a case where no collision has been detected (Step S302: No), the modulation processing unit 119 determines whether or not the transmission of the preamble block B1 has been completed (Step S303). In a case where transmission of the preamble block B1 has not been completed (Step S303: No), the communication apparatus 3 returns to the process in Step S301. In a case where the transmission of the preamble block B1 has been completed (Step S303: Yes), the modulation processing unit 119 transmits the space block B2 (Step S304).

While the space block B2 is transmitted, the collision detection unit 341 determines whether or not a collision has been detected on the basis of whether or not the collision notification signal 363 has been received (Step S305). In a case where the collision has been detected (Step S305: Yes), the modulation processing unit 119 stops transmitting the message and returns to the process in Step S101. In a case where no collision has been detected (Step S305: No), the modulation processing unit 119 determines whether or not the transmission of the space block B2 has been completed (Step S306). In a case where the transmission of the space block B2 has not been completed (Step S306: No), the modulation processing unit 119 returns to the process in Step S304. In a case where the transmission of the space block B2 has been completed (Step S306: Yes), the modulation processing unit 119 transmits the data block B3 (Step S307).

FIG. 15 is a flowchart illustrating an operation when the communication apparatus 3 illustrated in FIG. 12 has received the communication signal 340 illustrated in FIG. 11. When activating a reception function, the communication apparatus 3 starts the operation illustrated in FIG. 15. Hereinafter, portions different from those in the first embodiment will be mainly described.

After the buffering process in Step S115, the collision detection unit 341 determines whether or not a collision of the preamble portions 141 has been detected using a symbol string of the buffered block (Step S371). In a case where the collision has been detected (Step S371: Yes), the collision detection unit 341 transmits the collision notification unit 342 that the occurrence of the collision has been detected. The collision notification unit 342 generates the collision notification signal 363 that notifies the surrounding communication apparatuses 3 of the collision, and performs a collision notification process for transmitting the collision notification signal 363 (Step S375). In a case where no collision has been detected (Step S371: No), the communication apparatus 3 performs the transfer process in Step S116, and determines whether or not five more blocks have been received after the detection of the preamble pattern P1 (Step S372). Since the number of space blocks B2 is different between the first embodiment and the third embodiment, the number of blocks to be checked is different between Step S117 and Step S372.

Similarly, after the buffering process in Step S123, the collision detection unit 341 determines whether or not a collision of the preamble portions 141 has been detected using a symbol string of the buffered block (Step S373). In a case where the collision has been detected (Step S373: Yes), the collision notification unit 342 performs a collision notification process (Step S375). In a case where no collision has been detected (Step S373: No), the communication apparatus 3 performs the transfer process in Step S124, and determines whether or not three more blocks have been received after the detection of the preamble pattern P2 (Step S374).

As described above, in the third embodiment, combined waves of all messages transmitted or transferred by each of the communication apparatuses 3-6, 3-7, and 3-8 have preamble patterns and spaces emerging alternately. Therefore, the collision notification signal 363 is transmitted in space sections that appear alternately, and each of the communication apparatuses 3-6, 3-7, and 3-8 can easily detect the collision notification signal 363. This makes it possible to detect a collision caused by hidden terminals.

The configurations described above in the embodiments are merely examples of the content of the present invention, and can be combined with other publicly known techniques and partially omitted and/or modified without departing from the gist of the present invention.

For example, in the first embodiment described above, since the preamble pattern is stored in one of a number of preamble blocks B1, each communication apparatus 1 removes the detected preamble pattern, and then stores a preamble pattern different from the detected preamble pattern in the second block to be received subsequent to the first block in which the preamble pattern has been detected. However, in a case where the communication apparatus 1 as a transmission source of a message stores different preamble patterns in all the preamble blocks B1 of the communication signal 140, the communication apparatus 1 that relays the message only needs to remove the leading preamble pattern. Alternatively, without defining the multiple preamble blocks B1, the transfer processing unit 117 may replace the preamble pattern to be stored in one region at every relay operation. Even in such a case, it is possible to determine whether or not relaying is necessary only based on the head of the message.

REFERENCE SIGNS LIST 1, 2, 3, 1-1, 1-2, 1-3, 1-4, 1-5, 2-1, 2-2, 2-3, 2-4, 2-5, 3-6, 3-7, 3-8 communication apparatus; 10, 20, communication system; 101 memory; 102 processor; 103 communication instrument; 111 receiving antenna; 112 demodulation processing unit; 113 preamble detection unit; 114 subtraction unit; 115 distortion correction unit; 116 buffer unit; 117 transfer processing unit; 118, 343 transmission data switching unit; 119 modulation processing unit; 120 transmitting antenna; 121 coefficient calculation unit; 122 coefficient table storage unit; 123, 124 interference wave calculation unit; 125 transmission data storage unit; 140, 140-1, 140-2, 140-3, 340 communication signal; 141 preamble portion; 142 space portion; 143 data portion; 231-1, 231-2 correlation calculation unit; 341 collision detection unit; 342 collision notification unit; B1, B1-1, B1-2, B1-3 preamble block; B2, B2-1, B2-2, B2-3 space block; B3, B3-1, B3-2, B3-3 data block.

The invention claimed is:

1. A communication apparatus comprising:
a receiver to receive a communication signal, the communication signal including two or more preamble blocks that are signal regions with which two or more different preamble patterns are associated, respectively, the preamble pattern being stored in one of the preamble blocks;
a preamble detector to detect a preamble pattern from the communication signal; and
a transfer processor to, when the preamble pattern detected by the preamble detector is a predetermined preamble pattern, remove the detected preamble pattern from the communication signal, and transfer the communication signal while storing, in a second block, a preamble pattern associated with the second block that is a signal region following a first block that is a signal region in which the detected preamble pattern has been stored.

2. The communication apparatus according to claim 1, further comprising:
a subtractor to remove an interference wave component from the communication signal that is currently being received on the basis of the communication signal that has been received.

3. The communication apparatus according to claim 2, wherein the subtraction unit subtractor removes the interference wave component from the communication signal that is currently being received using the interference wave component calculated on the basis of the preamble block that has been received.

4. The communication apparatus according to claim 2, wherein
the communication signal includes a data block in which transmission data is stored,
the communication apparatus further comprises a correlation calculator to calculate a correlation between the data block that has been received and the data block that is currently being received, and
the subtractor removes the interference wave component from the communication signal that is currently being received, using the interference wave component calculated on the basis of the correlation.

5. The communication apparatus according to claim 4, wherein the subtractor removes the interference wave component from the communication signal that is currently being received, using both the preamble block that has been received and the data block that has been received.

6. The communication apparatus according to claim 1, wherein the number of the preamble blocks is larger than the maximum number of transfers by one.

7. The communication apparatus according to claim 1, wherein the communication signal includes a space block in which data is not stored after the preamble block and before a data block in which data is stored.

8. The communication apparatus according to claim 7, wherein the number of the space blocks is equal to or greater than the maximum number of transfers.

9. The communication apparatus according to claim 8, wherein
the number of the space blocks is greater than the maximum number of transfers, and
the communication apparatus further comprises:
a collision detector to detect a collision of the communication signals; and
a collision notifier to, in a case where the collision detector has detected a collision of the communication signals, notify a transmission source of the communication signal that the collision has been detected, using a period during which the space block is received.

10. The communication apparatus according to claim 9, further comprising a transmitter to generate and transmit the communication signal, wherein
the transmitter stops transmitting the communication signal when the notification is received while transmitting the preamble block of the communication signal.

11. A communication method comprising:
a step of a first communication apparatus generating and transmitting a communication signal in which a first preamble pattern is stored in a leading preamble block among a plurality of preamble blocks that are regions in each of which a preamble pattern is stored; and
a step of a second communication apparatus that has received the communication signal from the first communication apparatus, the second communication apparatus removing the first preamble pattern, and transferring the communication signal while storing a second preamble pattern different from the first preamble pattern in a preamble block subsequent to the leading preamble block.

12. A control circuit that controls a communication apparatus to cause the communication apparatus to execute:
a step of detecting a preamble pattern from a received signal, the received signal including two or more preamble blocks that are signal regions with which two or more different preamble patterns are associated, respectively, the preamble pattern being stored in one of the preamble blocks; and
a step of, when the detected preamble pattern is a predetermined preamble pattern, removing the detected preamble pattern from the received signal, and transferring the received signal while storing, in a second block, a preamble pattern associated with the second block that is a signal region following a first block that is a signal region in which the detected preamble pattern has been stored.

13. A non-transitory storage medium in which a program for controlling a communication apparatus is stored, the program causing the communication apparatus to execute:

a step of detecting a preamble pattern from a received signal, the received signal including two or more preamble blocks that are signal regions with which two or more different preamble patterns are associated, respectively, the preamble pattern being stored in one of the preamble blocks; and a step of, when the detected preamble pattern is a predetermined preamble pattern, removing the detected preamble pattern from the received signal, and transferring the received signal while storing, in a second block, a preamble pattern associated with the second block that is a signal region following a first block that is a signal region in which the detected preamble pattern has been stored.

\* \* \* \* \*

UNITED STATES PATENT AND TRADEMARK OFFICE
CERTIFICATE OF CORRECTION

| | | |
|---|---|---|
| PATENT NO. | : 11,082,121 B2 | Page 1 of 1 |
| APPLICATION NO. | : 16/755740 | |
| DATED | : August 3, 2021 | |
| INVENTOR(S) | : Michiya Hayama | |

It is certified that error appears in the above-identified patent and that said Letters Patent is hereby corrected as shown below:

On the Title Page

Please change:
"(54) APPARATUS AND METHOD FOR TRANFERING A COMMUNICATION SIGNAL WHILE STORING A DETECTED PREAMBLE PATTERN"
To:
--(54) APPARATUS AND METHOD FOR TRANSFERRING A COMMUNICATION SIGNAL WHILE STORING A DETECTED PREAMBLE PATTER--

In the Specification

At Column 1, Lines 1-4, Please change:
"APPARATUS AND METHOD FOR TRANFERING A COMMUNICATION SIGNAL WHILE STORING A DETECTED PREAMBLE PATTERN"
To:
--APPARATUS AND METHOD FOR TRANSFERRING A COMMUNICATION SIGNAL WHILE STORING A DETECTED PREAMBLE PATTER--

Signed and Sealed this
Twelfth Day of October, 2021

Drew Hirshfeld
*Performing the Functions and Duties of the*
*Under Secretary of Commerce for Intellectual Property and*
*Director of the United States Patent and Trademark Office*

UNITED STATES PATENT AND TRADEMARK OFFICE
CERTIFICATE OF CORRECTION

Page 1 of 1

PATENT NO. : 11,082,121 B2
APPLICATION NO. : 16/755740
DATED : August 3, 2021
INVENTOR(S) : Michiya Hayama It is certified that error appears in the above-identified patent and that said Letters Patent is hereby corrected as shown below:

On the Title Page

Please change:
"(54) APPARATUS AND METHOD FOR TRANSFERRING A COMMUNICATION SIGNAL WHILE STORING A DETECTED PREAMBLE PATTER"
To:
-- (54) APPARATUS AND METHOD FOR TRANSFERRING A COMMUNICATION SIGNAL WHILE STORING A DETECTED PREAMBLE PATTERN --

In the Specification

At Column 1, Lines 1-4, Please change:
"APPARATUS AND METHOD FOR TRANSFERRING A COMMUNICATION SIGNAL WHILE STORING A DETECTED PREAMBLE PATTER"
To:
-- APPARATUS AND METHOD FOR TRANSFERRING A COMMUNICATION SIGNAL WHILE STORING A DETECTED PREAMBLE PATTERN --

This certificate supersedes the Certificate of Correction issued October 12, 2021.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*